United States Patent
Bolukbasi et al.

(10) Patent No.: US 12,240,610 B2
(45) Date of Patent: Mar. 4, 2025

(54) INVERSION-FORMED DOUBLE-WALLED TUBE AND ENERGY ABSORBING INVERSION TUBE ASSEMBLY

(71) Applicant: The Boeing Company, Chicago, IL (US)

(72) Inventors: Akif O. Bolukbasi, Mesa, AZ (US); Timothy Gleason, Mesa, AZ (US)

(73) Assignee: The Boeing Company, Cjocago, IL (US)

( * ) Notice: Subject to any disclaimer, the term of this patent is extended or adjusted under 35 U.S.C. 154(b) by 618 days.

(21) Appl. No.: 17/536,783

(22) Filed: Nov. 29, 2021

(65) Prior Publication Data

US 2023/0166842 A1 Jun. 1, 2023

(51) Int. Cl.
  *B64D 11/06* (2006.01)
  *F16F 7/12* (2006.01)
(52) U.S. Cl.
  CPC ...... *B64D 11/0619* (2014.12); *B64D 11/0648* (2014.12); *B64D 11/0649* (2014.12); *F16F 7/12* (2013.01)
(58) Field of Classification Search
  None
  See application file for complete search history.

(56) References Cited

U.S. PATENT DOCUMENTS

| 4,509,621 A * | 4/1985 | Desjardins ............. F16F 7/125 |
| | | 188/372 |
| 5,566,777 A * | 10/1996 | Trommer ................. F16F 7/12 |
| | | 293/133 |
| 6,189,941 B1 | 2/2001 | Nohr |
| 6,231,095 B1* | 5/2001 | Chou ..................... B60R 19/34 |
| | | 293/133 |
| 6,702,345 B1 | 3/2004 | Yoshida |
| 9,016,448 B2 | 4/2015 | Ludin et al. |
| 2003/0209915 A1* | 11/2003 | Yoshida .................. F16F 7/125 |
| | | 293/133 |

FOREIGN PATENT DOCUMENTS

| CN | 2244115 Y | 1/1997 | |
| CN | 101283192 A * | 10/2008 | ......... F02D 41/2464 |
| CN | 107606019 A | 1/2018 | |
| CN | 111347990 A | 6/2020 | |
| DE | 102011109418 A1 * | 2/2013 | ............. B60R 19/34 |
| FR | 3093062 A1 * | 8/2022 | ........... B62D 29/002 |

* cited by examiner

*Primary Examiner* — Melanie Torres Williams
(74) *Attorney, Agent, or Firm* — Joseph M. Butscher; The Small Patent Law Group LLC

(57) ABSTRACT

An inversion-formed double-walled tube includes an outer tube having an outer wall thickness, an inner tube disposed inside the outer tube and having an inner wall thickness, and a transition portion connecting the inner tube and the outer tube. In this arrangement, at least one of the inner and outer wall thicknesses varies along a length of the double-walled tube. The inversion-formed double-walled tube may be configured as an inversion tube type energy absorber and as an energy absorbing inversion tube assembly.

19 Claims, 7 Drawing Sheets

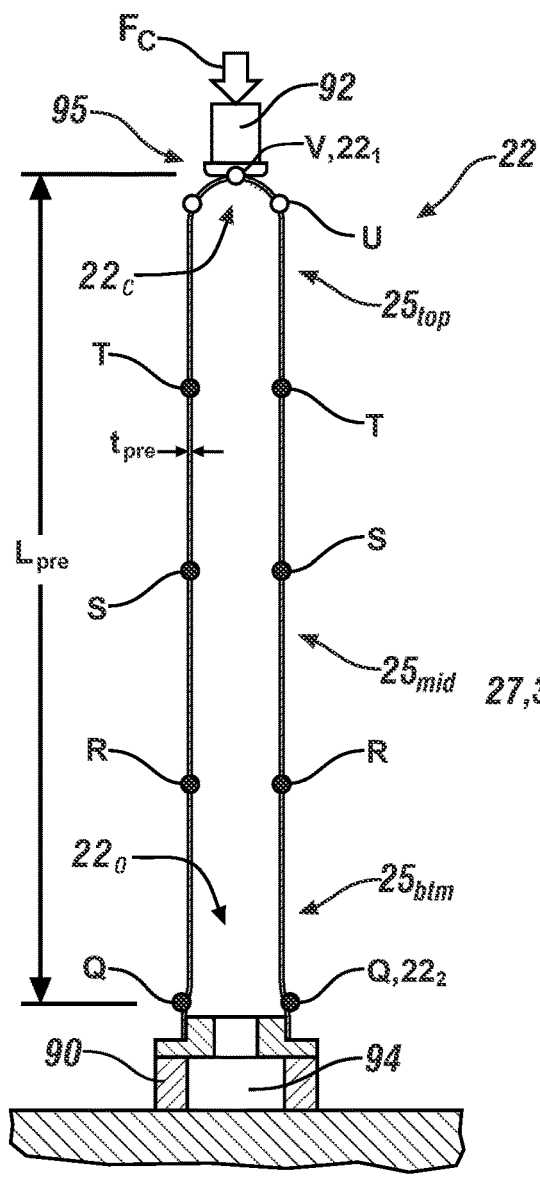
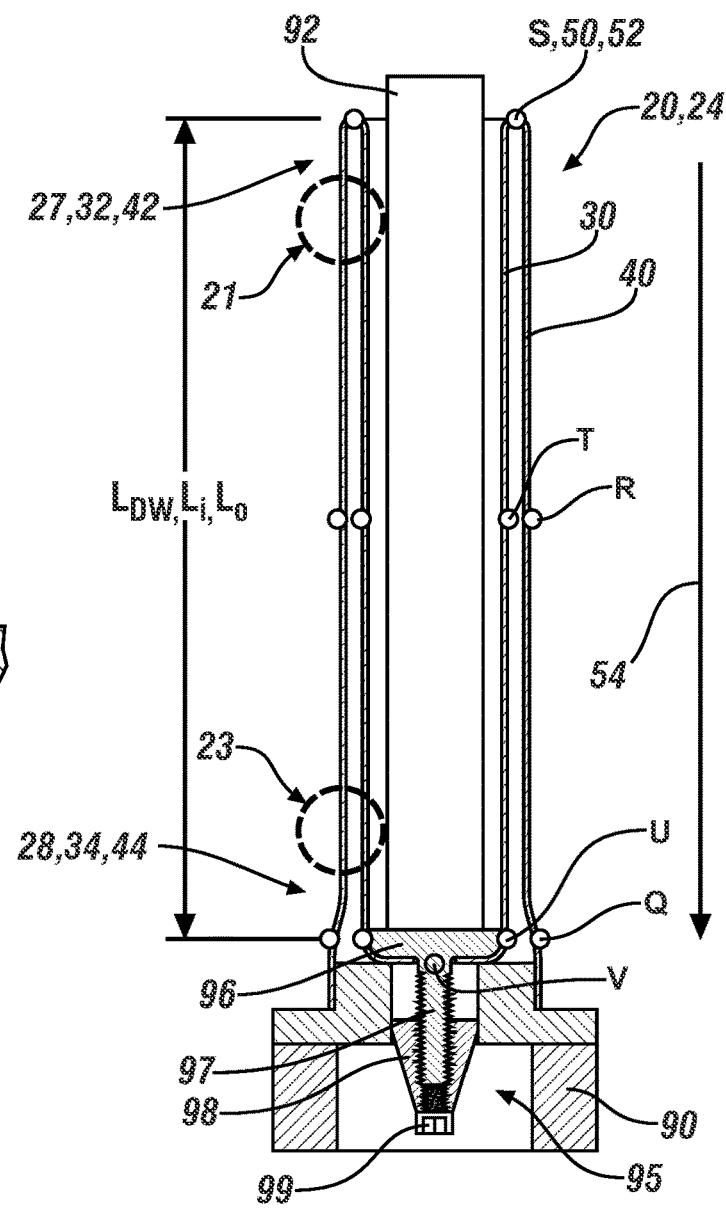
FIG. 1
FIG. 2

INVERSION-FORMED DOUBLE-WALLED TUBE AND ENERGY ABSORBING INVERSION TUBE ASSEMBLY

INTRODUCTION

This disclosure relates generally to inversion tube assemblies, and more particularly to inversion tube assemblies configured as energy absorbers.

In the field of safety, various measures are used to absorb, redirect and/or mitigate the effects of impulse forces on objects of interest. These measures include the use of reinforcements, restraints, padding, crumple zones, breakaway panels, shock absorbers, air bags and the like.

However, most of these measures are limited to providing a fixed degree of mitigation or energy absorption. For example, when a particular measure is implemented, it may be effective for acceptably mitigating a given impulse force for one group of cargo or payload, but it may not be as effective for mitigating that same impulse force for other groups (e.g., having different weight). It would be desirable, therefore, to provide a measure for mitigating impulse energy which is not fixed, but which may provide a variable degree of mitigation which depends upon the payload.

SUMMARY

According to one embodiment, an inversion-formed double-walled tube includes an outer tube having an outer wall thickness, an inner tube disposed inside the outer tube and having an inner wall thickness, and a transition portion connecting the inner tube and the outer tube, wherein at least one of the inner and outer wall thicknesses varies along a length of the double-walled tube.

The inner tube and the outer tube may be spaced apart from each other, and the inner tube, the outer tube and the transition portion may be made of aluminum, such as 3003H14 aluminum. The inner and outer wall thicknesses may vary similarly to each other along the length of the double-walled tube, or differently from each other along the length of the double-walled tube, or oppositely from each other along the length of the double-walled tube.

The outer tube may be formed as an external inversion of the inner tube, or the inner tube may be formed as an internal inversion of the outer tube. If the outer tube is formed as an external inversion of the inner tube, then the outer tube and the transition portion may be configured as a plastic deformation zone. On the other hand, if the inner tube is formed as an internal inversion of the outer tube, then the inner tube and the transition portion may be configured as a plastic deformation zone.

The inner and outer tubes may optionally have respective tube lengths that are substantially equivalent to each other. The inner tube may have a first end adjoining the transition portion and a second end opposite the first end, and the outer tube may have a third end adjoining the transition portion and a fourth end opposite the third end. In this arrangement, the inversion-formed double-walled tube may further include an inner fitting attached to the second end of the inner tube, and an outer fitting attached to the fourth end of the outer tube, wherein the inner and outer fittings may be configured for receiving compression and/or tension forces as applied thereto.

The inner fitting may include an axial member connected with the second end of the inner tube and configured to extend inside the inner tube. The inversion-formed doublewalled tube may further include an outer sleeve disposed about the outer tube and configured to provide resistance against buckling to the inner and/or outer tube when the inner and outer fittings are subjected to a compressive force. In this configuration, the outer sleeve may have a fifth end attached to the outer fitting and a sixth end attached to the fourth end of the outer tube.

When a compression force above a predetermined compression threshold or a tension force above a predetermined tension threshold is applied to the inner and outer fittings, one of the inner and outer tubes may increase in length and the other of the inner and outer tubes may decrease in length. The inversion-formed double-walled tube may be configured for dissipating impulse energy when a compression or tension impulse force above a respective predetermined compression or tension threshold is applied thereto. More specifically, the inner and outer tubes and the transition portion may be configured for dissipating energy when the compression or tension force above the respective predetermined compression or tension threshold is applied to the inner and outer fittings and the inner and outer tubes change in length.

According to another embodiment, an inversion tube type energy absorber includes: an outer tube having an outer wall thickness and an outer tube length; an inner tube disposed inside the outer tube and having an inner wall thickness and an inner tube length substantially equivalent to the outer tube length; and a transition portion connecting the inner tube and the outer tube and configured as a plastic deformation zone. In this embodiment, at least one of the inner and outer wall thicknesses varies along its respective inner or outer tube length.

The inversion tube type energy absorber may further include: an outer sleeve disposed about the outer tube and having opposed fifth and sixth ends; an inner fitting attached to a second end of the inner tube distal from the transition portion; and an outer fitting attached to the fifth end of the outer sleeve, with the sixth end of the outer sleeve being attached to a fourth end of the outer tube distal from the transition portion. In this configuration, the inner and outer fittings may be configured for receiving compression and/or tension forces as applied thereto and for conveying the compression and/or tension forces to the inner and outer tubes.

According to yet another embodiment, a method of manufacturing an energy absorbing inversion tube assembly includes: (i) providing a tube having opposed first and second ends, an initial length and an initial wall thickness which varies along at least a portion of the initial length; and (ii) inverting the first end of the tube toward the second end, thereby forming an inversion tube having an inner tube disposed within an outer tube with the inner and outer tubes being connected with each other via a transition portion, wherein a respective wall thickness of at least one of the inner and outer tubes varies along a respective length of the inner or outer tube.

The method may further include attaching an inner fitting to a second end of the inner tube distal from the transition portion, and attaching an outer fitting to a fourth end of the outer tube distal from the transition portion, wherein the inner and outer fittings are configured for conveying external compression and/or tension forces to the inner and outer tubes, respectively. Additionally, the method may also include disposing an outer sleeve having opposed fifth and sixth ends about the outer tube, and attaching the fifth end of the outer sleeve to the outer fitting and the sixth end of the outer sleeve to the fourth end of the outer tube.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 1 is a schematic cross-sectional view of an inversion tube before being inverted.

FIG. 2 is a magnified schematic cross-sectional view of the inversion tube of FIG. 1 after being inverted.

DETAILED DESCRIPTION

Figure 3:
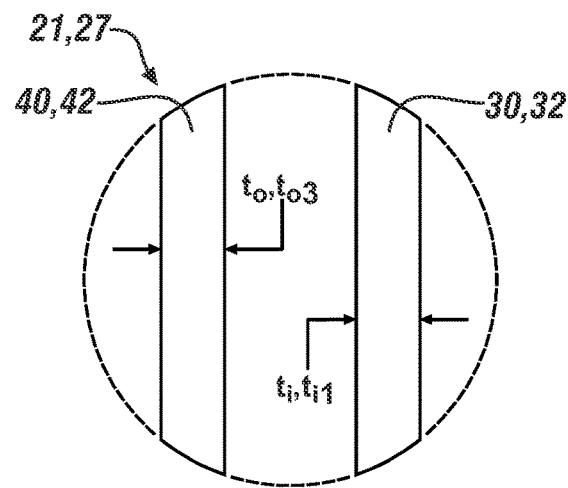
FIGS. 3-4 are magnified views of the upper and lower locations encircled with dashed lines at the top and bottom, respectively, of FIG. 2.

Referring now to the drawings, wherein like numerals indicate like parts in the several views, an inversion-formed double-walled tube 20 is shown and described herein. Note that in some embodiments, the inversion-formed double-walled tube 20 may also be described as an inversion tube type energy absorber 20, an energy absorbing inversion tube assembly 20, or simply as an inversion tube 20.

FIGS. 1-10 show schematic views illustrating various structural features of the inversion tube 20 and its stages of manufacture. For example, FIG. 1 shows a cross-sectional view of an inversion tube 20 before being inverted, which may be referred to as a pre-inversion tube 22. The pre-inversion tube 22 is made of metal (e.g., aluminum) and may undergo a process of either "internal inversion"—in which one end of the tube 22 is pressed inward and along some length on the inside of the tube 22—or "external inversion"—in which one end of the tube 22 is pulled outward and along some length on the outside of the tube 22. In either case, the result of the inversion process is a double-walled tube 20 that has an inner tube 30 and an outer tube 40 along some length of the finished/inverted tube 20.

As illustrated in FIG. 1, one end of the pre-inversion tube 22—designated here as a top end $25_{top}$—is swaged or spun so as to be completely closed (i.e., a closed end $22c$), while the opposing end—designated here as a bottom end $25_{btm}$—is left open, and optionally may be outwardly flared (i.e., an open end $22o$). The pre-inversion tube 22 may be mounted with its open bottom end $22_o$, $25_{btm}$ placed over a fixed base 90, with the closed top end $22_c$, $25_{top}$ extending upward. A plunger 92 may be brought into contact with the top end $25_{top}$ in preparation for an internal inversion of the tube 22. Note that letters Q, R, S, T, U and V are used in FIGS. 1-2 and 9-10 to indicate points along the length of the pre-inversion tube 22, starting with point Q near the open bottom end $22_O$, $25_{btm}$, point V at the apex of the rounded/closed top end $22c$, $25_{top}$, and point S near the middle $25_{mid}$ of the tube 22. These points Q, R, S, T, U, V are used to show how the inversion tube 22 changes in shape as it progresses through the inversion process.

With the pre-inversion tube 22 positioned as shown in FIG. 1, a compression force $F_c$ may be directed downward through the plunger 92 as shown. This compression force $F_c$ causes the top $25_{top}$ of the tube 22 to collapse inward, and as the plunger 22 is pressed further downward it causes the former top $25_{top}$ of the tube 22 to be pressed downward within the interior of the tube 22 as well, thus causing an internal inversion 24. If the plunger 92 continues to be pressed downward, it may reach the configuration shown in FIG. 2, in which the former apex point V is positioned just below the Q points, the U points align laterally with the Q points, the T points align laterally with the R points, and the S points—which were previously at about the middle of the pre-inversion tube 22—are now at the top 27 of the resulting double-walled inversion tube 20.

In FIG. 2, the double-walled inversion tube 20 has an inner tube (or inner tube portion) 30 and an outer tube (or outer tube portion) 40, which are joined together at a U-shaped transition portion 50 at the S points. The inner tube 30 has a first end 32 adjoining the transition portion 50 and a second end 34 opposite the first end 32, and the outer tube 40 has a third end 42 adjoining the transition portion 50 and a fourth end 44 opposite the third end 42. The inner tube 30 has an inner tube length $L_i$ (as measured from the first end 32 of the inner tube 30 near the transition portion 50 and S points, to the second end 34 near the U points), and the outer tube 40 has an outer tube length $L_o$ (as measured from the third end 42 of the outer tube 40 near the transition portion 50 and S points, to the fourth end 44 near the Q points), with the inner and outer tube lengths $L_i$, $L_o$ being about the same length as each other and about the same as the overall double-walled inversion tube length $L_{DW}$. The former top end $25_{top}$ which includes points U and V may include a spindle assembly 95 or other structure as illustrated in FIG. 2 which the plunger 92 presses upon (and which in turn presses on the former top end $25_{top}$). For example, the spindle assembly 95 may include a disc 96 with an attached downwardly extending stem 97, a frusto-conical guide 98, and an end bolt 99 which secures the guide 98 to the stem 97. The stem 97 may have internal threads to receive the bolt 99, and may optionally have external threads as well. The stem 97, guide 98 and bolt 99 may be urged by the plunger 92 into a central axial cavity 94 formed in or through the base 90; thus, the spindle assembly 95 may be used to facilitate the internal inversion process. After the internal inversion process is completed, the bolt 99 and guide 98 may be removed and an appropriate fitting (discussed below) may be attached to the stem 97.

Figure 4:
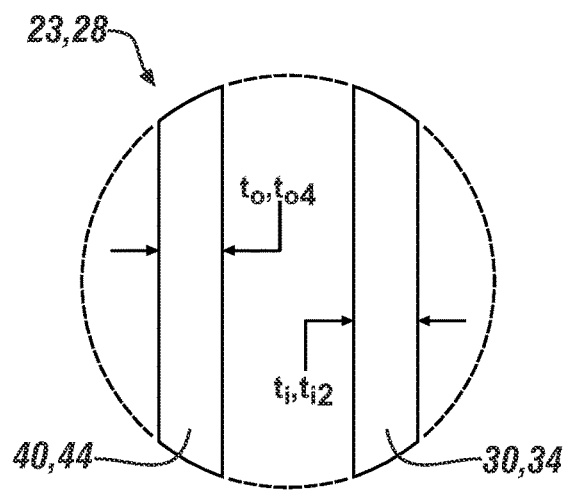

FIGS. 3-4 show magnified views of the upper and lower locations 21, 23 in dashed circles at the top 27 and bottom 28, respectively, of the inversion tube 20 of FIG. 2. In FIG. 3, the upper location 21 shows (i) the inner wall thickness $t_i$ of the inner tube 30, and in particular the inner wall thickness $t_{i1}$ at the first end 32 of the inner tube 30, as well as (ii) the outer wall thickness $t_o$ of the outer tube 40, and in particular the outer wall thickness $t_{o3}$ at the third end 42 of the outer tube 40. Similarly, in FIG. 4, the lower location 23 shows (i) the inner wall thickness $t_i$ of the inner tube 30, and in particular the inner wall thickness $t_{i2}$ at the second end 34 of the inner tube 30, as well as (ii) the outer wall thickness $t_o$ of the outer tube 40, and in particular the outer wall thickness $t_{o4}$ at the fourth end 44 of the outer tube 40. As used herein, reference numerals $t_i$ and $t_o$ without any numerical subscript refer to the wall thicknesses of the inner and outer tubes 30, 40, respectively, in a generalized manner (i.e., anywhere along the length of the respective tube 30, 40), while reference numerals $t_{i1}$, $t_{i2}$, $t_{o3}$ and $t_{o4}$ with numerical subscripts refer to the wall thicknesses at specific locations or ends of the tubes 30, 40. Also note that FIG. 1 shows a generalized wall thickness $t_{pre}$ of the pre-inversion tube 22.

It is noteworthy that conventional approaches to manufacturing inversion tubes (whether internally inverted or externally inverted) utilize a pre-inversion tube which has a uniform wall thickness—i.e., a wall thickness that is constant along the length of the tube. In contrast, the inversion tube 20 of the present disclosure intentionally uses a varying wall thickness along some length of the tube 20. This varying wall thickness may be configured so as to absorb compression and/or tension forces at a more controllable, predictable and/or customizable rate than may be accomplished using a conventional inversion tube.

Figure 5:
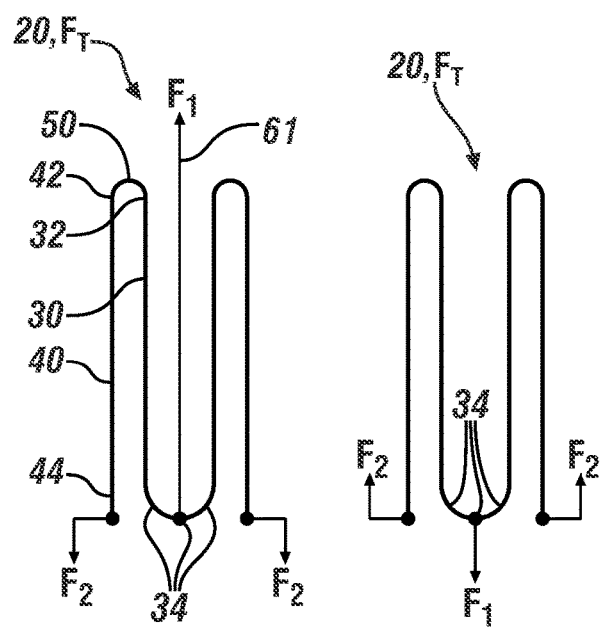
FIGS. 5-8 are schematic views of a fully inverted inversion tube being subjected to various tension and compression loadings.
Figure 6:
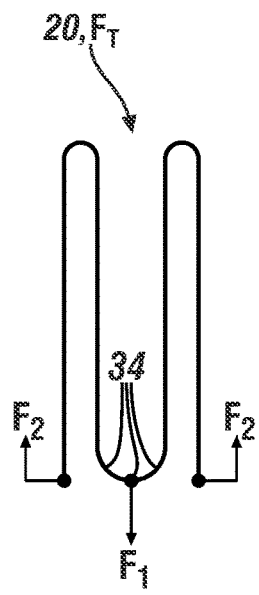
Figure 7:
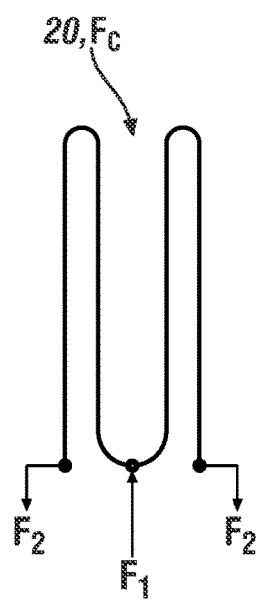
Figure 8:
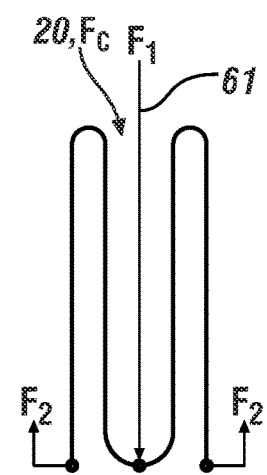

FIGS. 5-8 show schematic views of a fully inverted inversion tube 20 being subjected to various tension and compression loadings. (Note that, as used herein, a "fully inverted" inversion tube 20 is one in which the inner tube length $L_i$, the outer tube length $L_o$, and the length of the overall inverted tube $L_{DW}$ are about the same length of each other.) Each of these tubes 20 may be internally inverted or externally inverted. In FIGS. 5 and 8, an axial member 61 extends into and along the full length $L_i$ of the inner tube 30 and is attached to the inner tube 30 at or near the second end 34. In FIG. 5, an upwardly directed first force $F_1$ is exerted on the axial member 61, and thus on the second end 34 of the inner tube 30 as well, while a downwardly directed second force $F_2$ is exerted on the fourth ends 44 of the outer tube 40, thus causing a tensile or tension loading or net force $F_T$ to be placed on the inversion tube 20. Oppositely, in FIG. 8, a downwardly directed first force $F_1$ is exerted on the axial member 61, and thus on the second end 34 of the inner tube 30 as well, while an upwardly directed second force $F_2$ is exerted on the fourth ends 44 of the outer tube 40, thus causing a compressive or compression loading or net force $F_c$ to be placed on the inversion tube 20. In FIGS. 6-7, no axial member 61 is used, and the first force $F_1$ is exerted on the second end 34 of the inner tube 30 from outside of the inner tube 30. In FIG. 6, a downwardly directed first force $F_1$ is exerted on the second end 34 of the inner tube 30, while an upwardly directed second force $F_2$ is exerted on the fourth ends 44 of the outer tube 40, thus causing a tensile or tension loading or net force $F_T$ to be placed on the inversion tube 20. And in FIG. 7, an upwardly directed first force $F_1$ is exerted on the second end 34 of the inner tube 30, while a downwardly directed second force $F_2$ is exerted on the fourth ends 44 of the outer tube 40, thus causing a compressive or compression loading or net force $F_c$ to be placed on the inversion tube 20. It should be noted, however, that whether the net loading or net force is considered as "compression" or "tension" depends on the frame of reference used, whether the forces $F_1$, $F_2$ are "push" forces or "pull" forces, how the elements and linkages transmitting the forces $F_1$, $F_2$ are arranged, etc.

Figure 9:
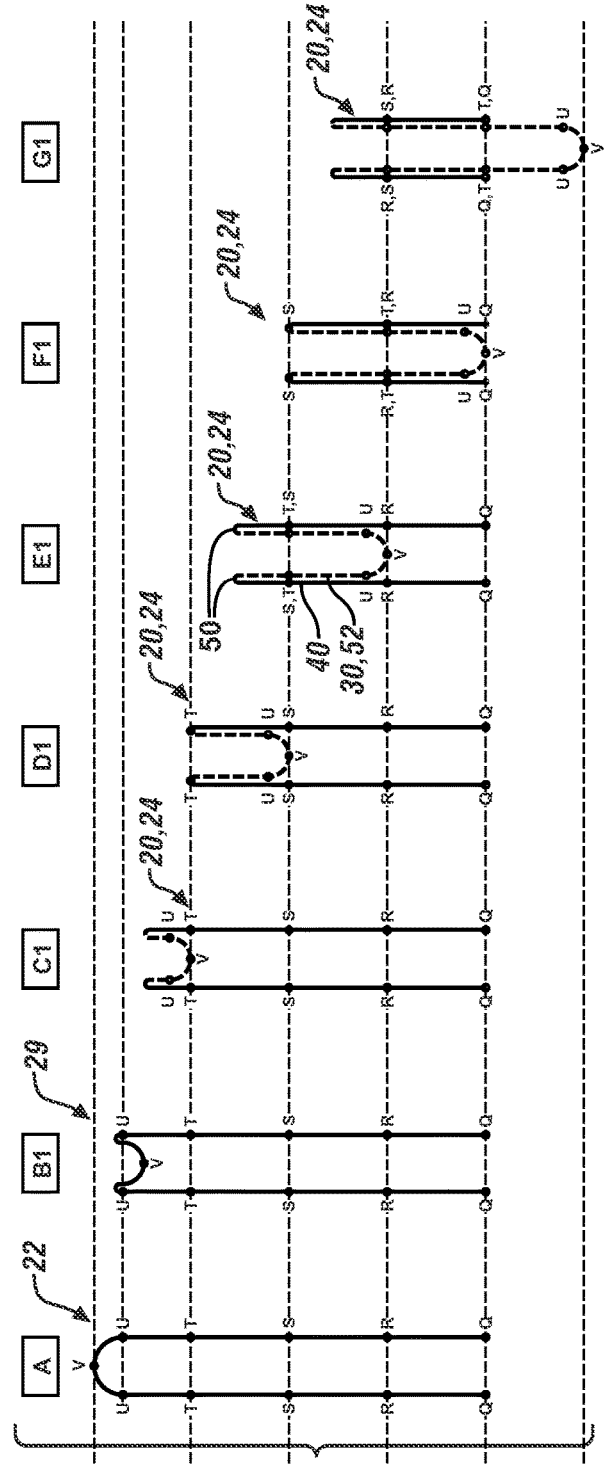
FIG. 9 is a series of schematic views of an inversion tube showing successive stages of the tube undergoing internal inversion.
Figure 10:
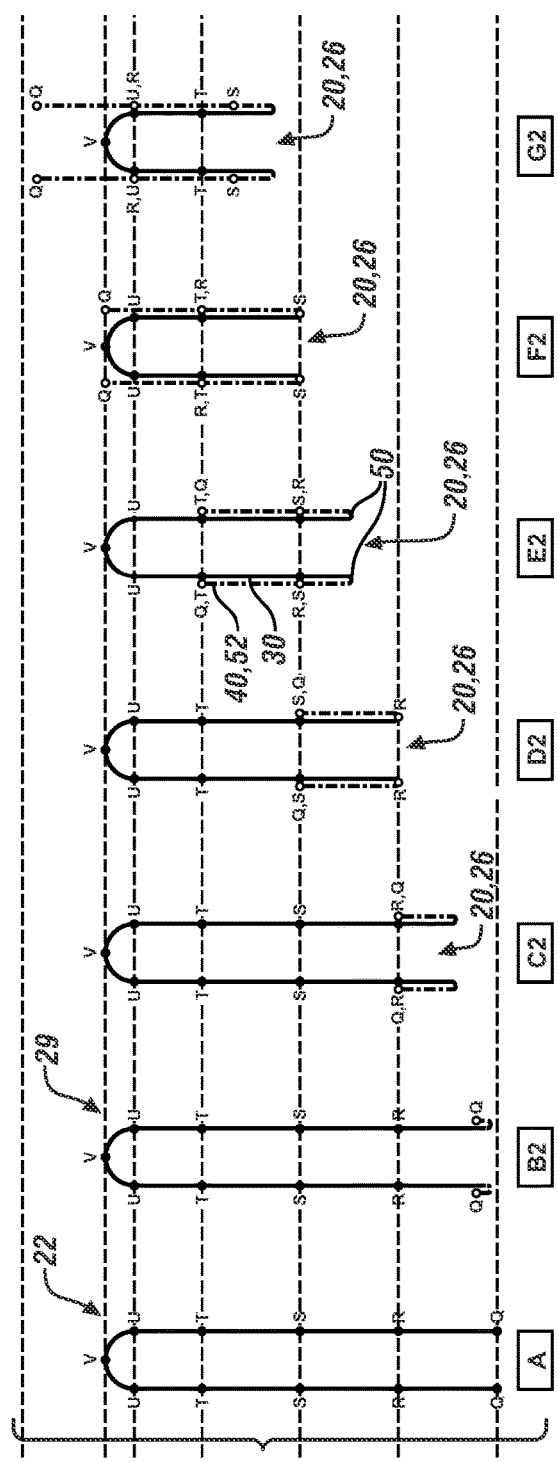
FIG. 10 is a series of schematic views of an inversion tube showing successive stages of the tube undergoing external inversion.

FIG. 9 shows a series of schematic views of an inversion tube 20 undergoing successive stages of internal inversion, while FIG. 10 shows an inversion tube 20 undergoing external inversion. (Note that, as used herein, reference numeral 24 refers to an "internal inversion" and 26 refers to an "external inversion", where the use of these reference numerals denotes referring to a resulting manufactured item or physical product. On the other hand, when mention is made herein of an "internal inversion" or an "external inversion" without reference numerals, such mention without reference numerals denotes referring to a manufacturing process, but not to the product manufactured.) FIG. 9 begins at view "A" with a pre-inversion tube 22 before any inversion has begun. In view "B1", an initially-inverted tube 29 is shown, where the apex point V has just been pressed inward. At this point in view "B1", there is substantially no inner tube 30 formed yet. However, at view "C1", the inner tube 30 begins to form and a double-walled inversion tube 20 is created. As the apex point V continues to be pressed inward along the longitudinal axis of the tube 20 in views "C1", "D1" and "E1", the overall length $L_{DW}$ of the tube 20 continues to decrease, until view "F1" where the inner tube length $L_i$, the outer tube length $L_o$ and the overall inversion tube length $L_{DW}$ are all about the same as each other. Optionally, the apex point V may continue to be pressed inward, such that the inner tube length $L_i$ continues to increase and the outer tube length $L_o$ continues to decrease, as shown in view "G1", in which the overall inversion tube length $L_{DW}$ is now longer than it was in view "F1" (and appears to be about the same as the overall length $L_{DW}$ of view "E1").

In a similar manner, FIG. 10 begins at view "A" with a pre-inversion tube 22 before any inversion has begun. In view "B2", an initially-inverted tube 29 is shown, where the Q points have just been rolled outward. At this point in view "B2", there is little or no outer tube 40 formed yet. However, at view "C2", the outer tube 40 begins to form and a double-walled inversion tube 20 is created. As the Q, R and other points continue to be rolled outward and along the longitudinal axis of the tube 20 in views "C2", "D2" and "E2", the overall length $L_{DW}$ of the tube 20 continues to decrease, until view "F2" where the inner tube length $L_i$, the outer tube length $L_o$ and the overall inversion tube length $L_{DW}$ are all about the same as each other. Optionally, the Q, R, S and other points may continue to be rolled outward and along the longitudinal axis of the tube 20, such that the outer tube length $L_o$ continues to increase and the inner tube length $L_i$ continues to decrease, as shown in view "G2", in which the overall inversion tube length $L_{DW}$ is now longer than it was in view "F2" (and appears to be about the same as the overall length $L_{DW}$ of view "E2").

Depending upon the intended application for the inversion tube 20, one of the configurations shown in the views of FIGS. 9-10 may be selected. It may be noted that the configurations shown in view "F1" of FIG. 9 and in view "F2" of FIG. 10 appear to be the same, but just upside-down with respect to each other. On one hand that is true, but on the other hand there may be some significant differences between the configurations shown in those two views. First, note that while both configurations appear to begin with the same length and diameter of the pre-inversion tube 22 in view "A", the diameters of the inner and outer tubes 30, 40 may be different as compared between the two configurations. For example, since the configuration shown in view "F1" of FIG. 9 is an internal inversion 24, the diameter of the outer tube 40 will remain the same as the starting diameter of the pre-inversion tube 22, but the diameter of the inner tube 30 will be smaller than the outer and pre-inversion tube diameters. And since the configuration shown in view "F2" of FIG. 10 is an external inversion 26, the diameter of the inner tube 30 will remain the same as the starting diameter of the pre-inversion tube 22, but the diameter of the outer tube 40 will be larger than the inner and pre-inversion tube diameters. And second, there is a difference between the "F1" and "F2" configurations in that in the "F1" configuration, the inner tube 30 was formed by plastically deforming the original tube wall (as a result of the apex point V being pushed continually inward) with the outer tube 40 not being plastically deformed, while in the "F2" configuration, the outer tube 40 was formed by plastically deforming the original tube wall (as a result of the Q and other points being rolled continually outward and along the longitudinal axis of the tube) with the inner tube 30 not being plastically deformed. The portions of the original pre-inversion tube 22 that are subjected to plastic deformation may be referred to as "plastic deformation zones" 52, or collectively as a "plastic deformation zone" 52. These plastic deformation zones 52 are denoted in FIG. 9 by dashed lines and in FIG. 10 by dash-dot lines. However, given that the fully inverted "F1" and "F2" configurations may be the most commonly selected shape, one may select the pre-inversion tube size and starting dimensions such that the first of the abovementioned differences is negated (i.e., the desired resulting dimensions are achieved), with the second of the abovementioned differences simply offering the designer a choice as to whether it would be more suitable for the plastic deformation to be present in the inner tube 30 or the outer tube 40 (i.e., depending on the intended application).

Figure 16:
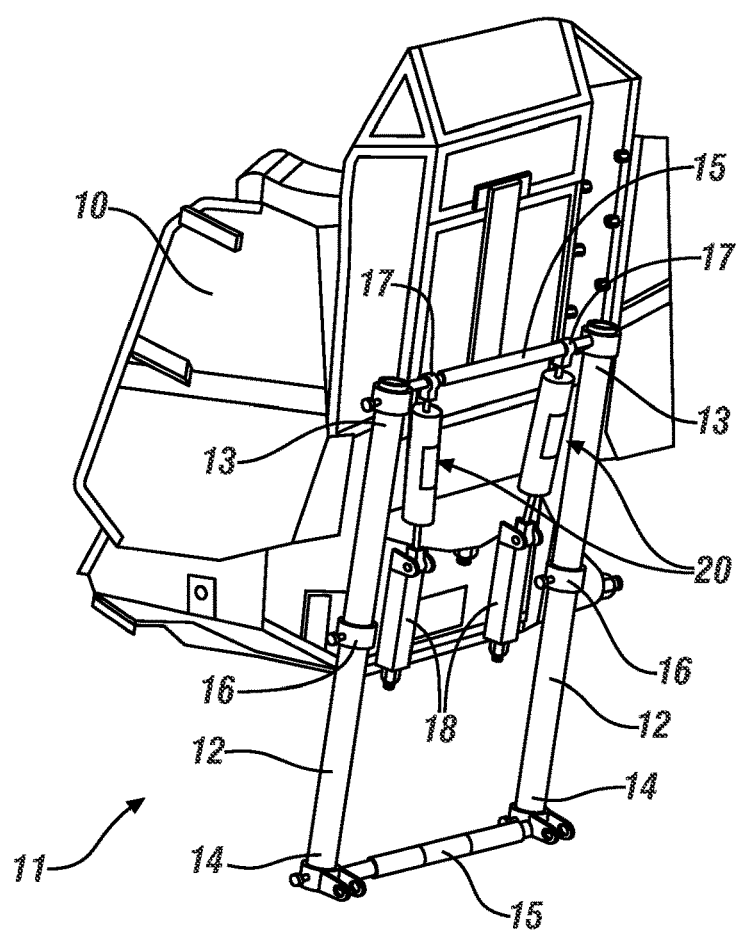
FIG. 16 is a rear perspective view of an aircraft seat equipped with energy absorbing inversion tube assemblies according to the present disclosure.

For example, FIG. 16 illustrates one potential application of the double-walled inversion tube/energy absorber assembly 20 of the present disclosure. Here, a rear perspective view of an aircraft seat 10 equipped with energy absorbing inversion tube assemblies 20 is shown. A rigid, generally rectangular frame 11 is attached to the back of the seat 10. The frame 11 includes two vertical tubes or bars 12, each having a top end 13 and a bottom end 14, with a top horizontal tube or bar 15 connected to the two top ends 13 and a bottom horizontal tube or bar 15 connected to the two bottom ends 14. A respective sliding tubular connector 16 is slidably connected to each of the two vertical tubes 12, with each tubular connector 16 being attached to the lower back of the seat 10. The lower back of the seat 10 also includes one or two mounting areas 18 (e.g., stanchions), each or both which may also be attached to the tubular connectors 16. Two inversion tubes/energy absorber assemblies 20 are arranged on the back of the seat 10 such that a top end of each is connected to the top horizontal bar 15 (or to a top horizontal bar connector 17) that is connected to the top horizontal bar), and a bottom end of each is connected to the mounting area(s) 18.

In this arrangement, the frame 11 may be affixed to the aircraft with some volume of empty space provided underneath the seat 10 into which the seat 10 may egress in the event of a rough landing, with the inversion tubes 20 serving as energy absorbers (similar to so-called shock absorbers). That is, in the event of a landing that provides an impulse force on the seat 10 above a predetermined value, the seat 10 may glide downward along the vertical tubes 12 toward the empty space provided underneath the seat 10, but with the inversion tubes 20 effectively absorbing some portion of the impulse energy. With the thickness $t_i$, $t_o$ of the inner and/or outer tubes 30, 40 being varied and profiled as described herein, the seat 10, frame 11 and inversion tubes 20 may absorb impulse energy in a way that can accommodate a wide range of occupants (e.g., from a $5^{th}$ percentile female to a $95^{th}$ percentile male).

Figure 11:
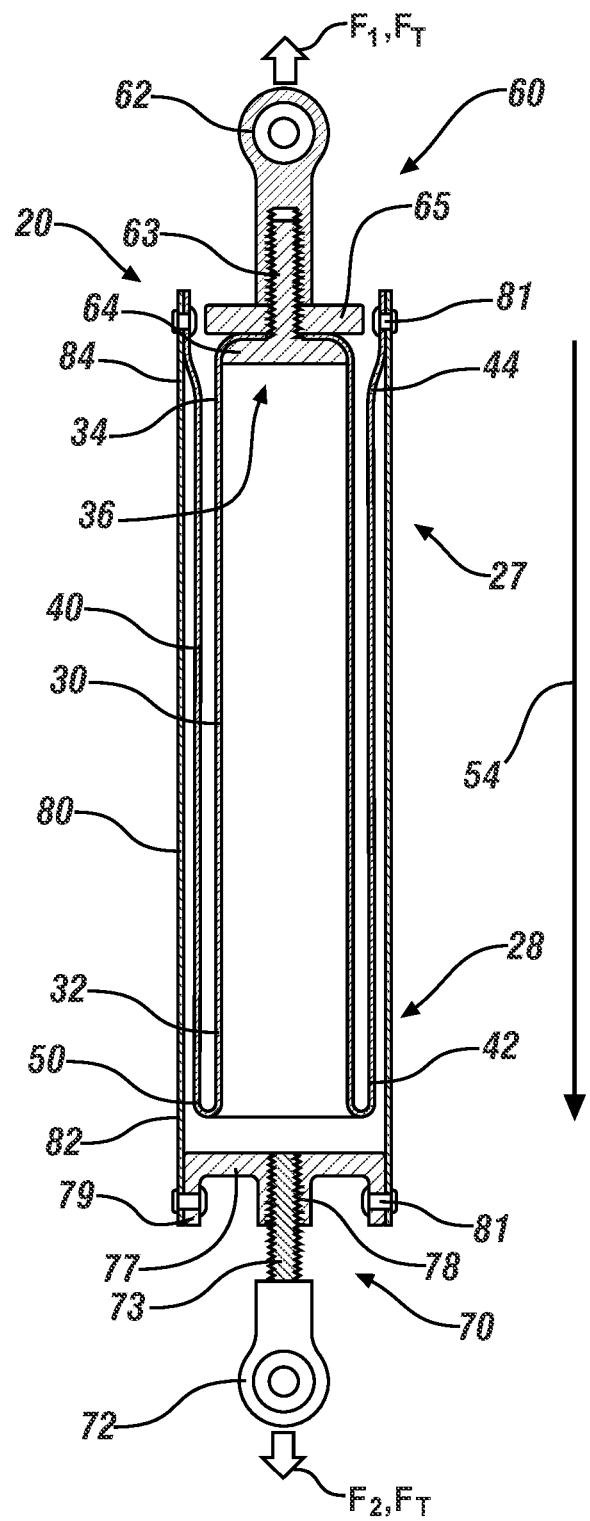
FIG. 11 is a schematic cross-sectional view of a first embodiment of a fully inverted inversion tube configured for tension loading.
Figure 12:
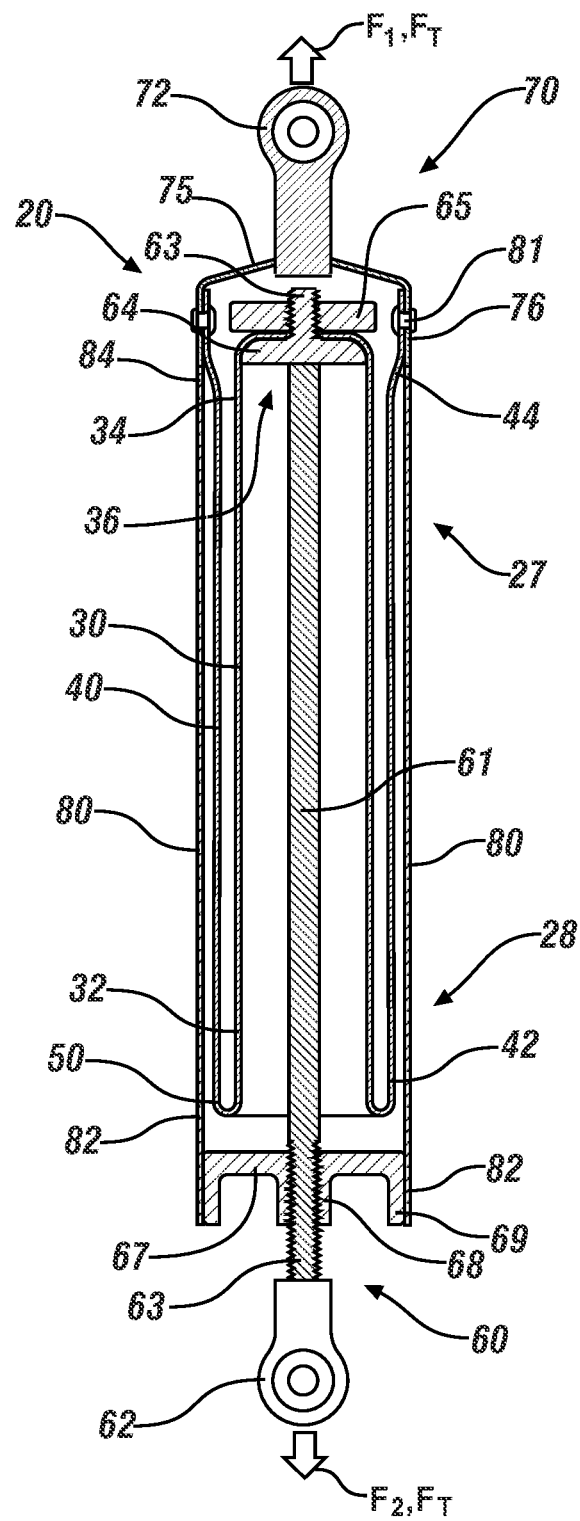
FIG. 12 is a schematic cross-sectional view of a second embodiment of a fully inverted inversion tube configured for tension loading.
Figure 13:
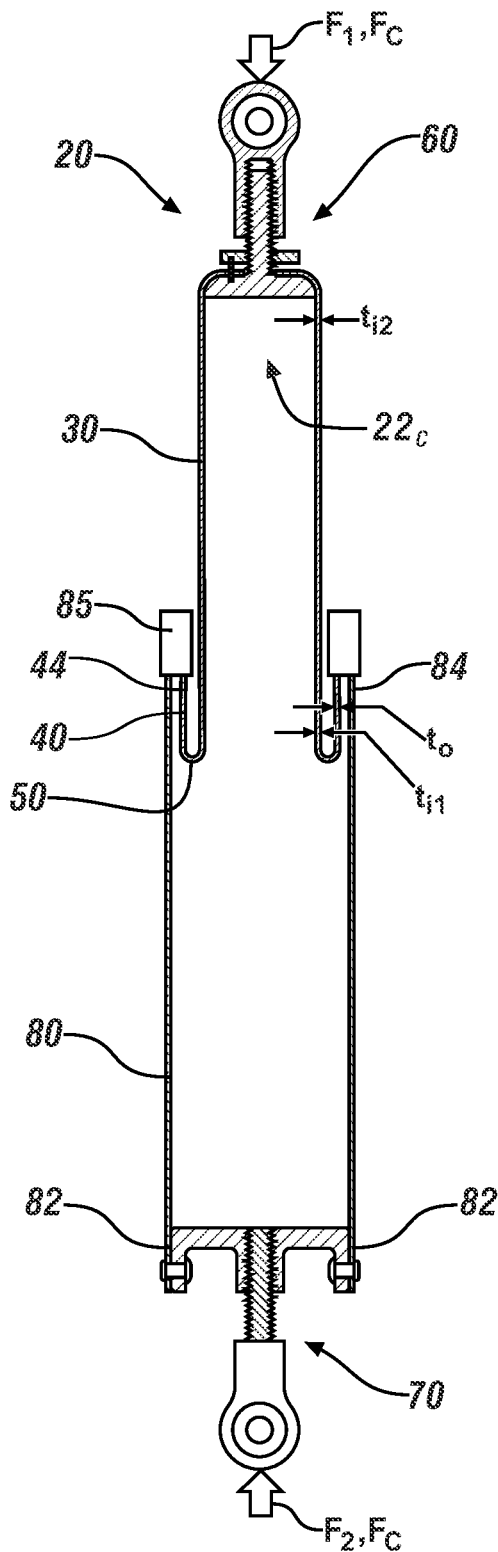
FIG. 13 is a schematic cross-sectional view of an inversion tube embodiment configured for compression loading.
Figure 14:
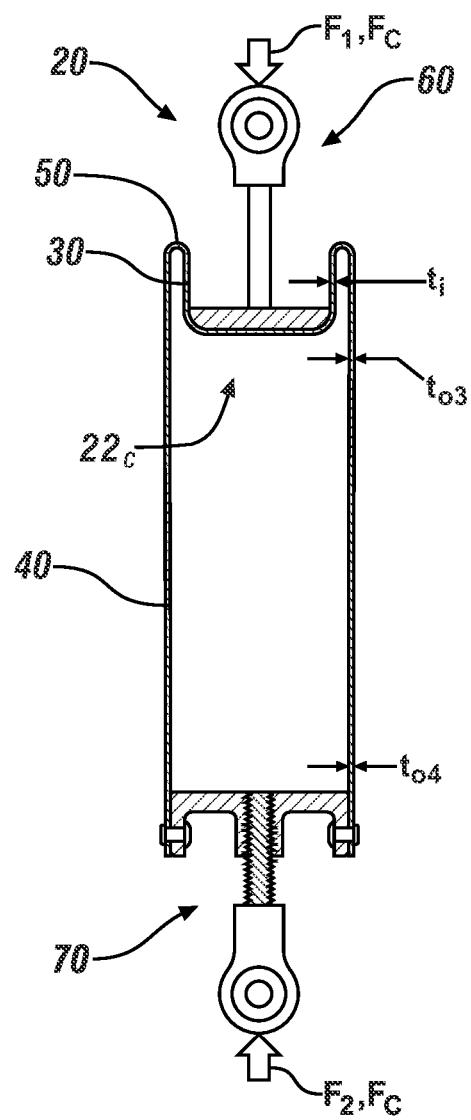
FIGS. 14-15 are schematic cross-sectional views of another inversion tube embodiment configured for compression loading without an outer sleeve and with an outer sleeve, respectively.
Figure 15:
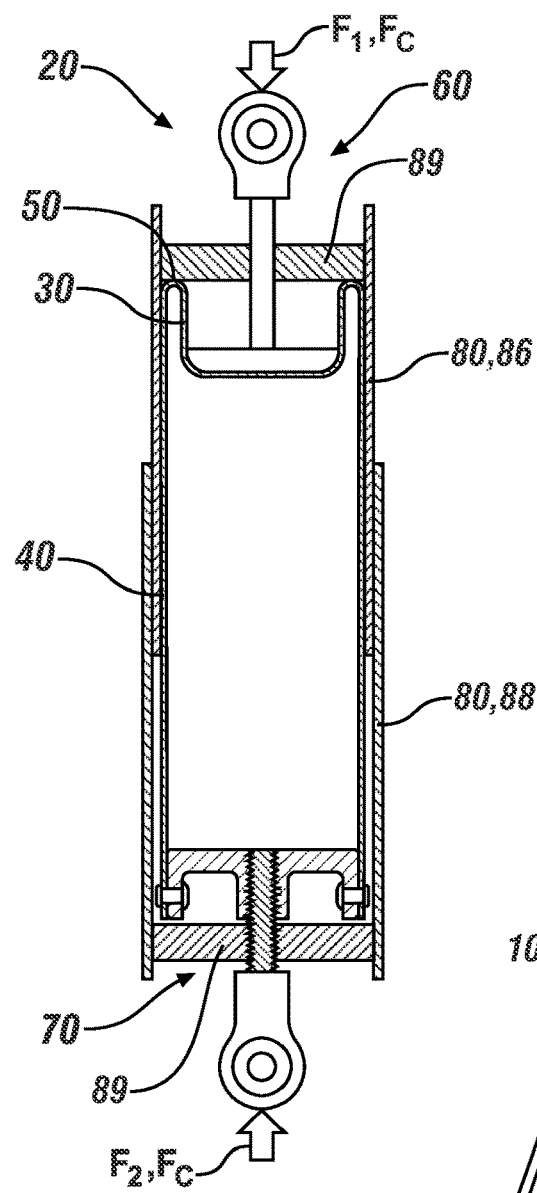

FIGS. 11-15 show various embodiments of an energy-absorbing inversion tube assembly 20 according to the present disclosure. Specifically, FIGS. 11-12 show schematic cross-sectional views of first and second embodiments, respectively, of a fully inverted inversion tube 20 configured for tension loading, FIG. 13 shows a schematic cross-sectional view of an embodiment configured for compression loading, and FIGS. 14-15 show schematic cross-sectional views of another inversion tube embodiment configured for compression loading, in which FIG. 14 shows the embodiment without an outer sleeve 80 and FIG. 15 shows the same embodiment with an outer sleeve 80.

FIGS. 11-12 show two similar but different embodiments that are configured for tension loading. In either embodiment, the inversion-formed double-walled tube 20 includes an outer tube 40 having an outer wall thickness $t_o$, an inner tube 30 disposed inside the outer tube 40 and having an inner wall thickness $t_i$, and a transition portion 50 connecting the inner and outer tubes 30, 40, in which at least one of the inner and outer wall thicknesses $t_o$ varies along at least some portion of the overall length $L_{Dw}$ of the double-walled tube 20. The inner and outer tubes 30, 40 may be spaced apart from each other, and the inner tube 30, the outer tube 40 and the transition portion 50 may be made of aluminum, such as 3003H14 aluminum, or any other suitable material. The inner and outer wall thicknesses $t_i$, $t_o$ may vary in a way that is similar to each other along the length $L_{DW}$ of the double-walled tube 20, or they may vary differently from each other along the overall tube length $L_{DW}$ (including varying oppositely from each other). For example, (i) both the inner tube thickness $t_i$ and the outer tube thickness $t_o$ may increase in the downward direction 54 (i.e., from the top 27 of the inversion tube 20 to the bottom 28), or (ii) both may decrease in thickness in the downward direction 54, or (iii) one of these two thicknesses $t_i$, $t_o$ may increase in the downward direction 54 while the other of the two thicknesses $t_i$, $t_o$ decreases, or (iv) one of the thicknesses $t_i$, $t_o$ may increase or decrease in the downward direction 54 while the other remains at a constant thickness. The variation in wall thickness (whether $t_i$ or $t_o$ or both) along the length $L_{DW}$ of the inversion tube 20 defines a thickness profile, which may vary linearly or non-linearly (e.g., logarithmically, exponentially, etc.) along the longitudinal axis or overall length $L_{DW}$ of the tube 20.

The outer tube 40 may be formed as an external inversion 26 of the inner tube 30, or the inner tube 30 may be formed as an internal inversion 24 of the outer tube 40. If the outer tube 40 is formed as an external inversion 26 of the inner tube 30, then the outer tube 40 and the transition portion 50 may be configured as a plastic deformation zone 52. On the other hand, if the inner tube 30 is formed as an internal inversion 24 of the outer tube 40, then the inner tube 30 and the transition portion 50 may be configured as a plastic deformation zone 52.

In some configurations, such as those shown in views "F1" and "F2" in FIGS. 9-10, and in the embodiments of FIGS. 2, 5-8 and 11-12, the inner and outer tubes 30, 40 may optionally have respective tube lengths $L_i$, $L_o$ that are substantially equivalent to each other. In such embodiments, these substantially equivalent tube lengths $L_i$, $L_o$ may also be substantially equivalent to the overall length $L_{DW}$ of the inversion tube 20 (i.e., $L_i \approx L_o \approx L_{DW}$).

In order for the double-walled inversion tube 20 to function as an energy absorber, the inner and outer tubes 30, 40 may be attached to appropriate fittings 60, 70 which can be used to impart compression force or loading $F_c$ and/or tension force or loading FT to the inner and outer tubes 30, 40. In practice, there are multiple ways in which the fittings 60, 70 may be attached to the inner and outer tubes 30, 40.

In the embodiments shown in FIGS. 11-15, the inversion tube 20 includes an inner fitting 60 attached directly to the second end 34 of the inner tube 30, and an outer fitting 70 attached directly or indirectly to the fourth end 44 of the outer tube 40. In embodiments where the outer fitting 70 is attached indirectly to the fourth end 44 of the outer tube 40 (e.g., FIGS. 11 and 13), an outer sleeve 80 may serve as an intermediary therebetween, as described in further detail below. The inner and outer fittings 60, 70 are configured for receiving compression and/or tension forces $F_c$, $F_T$ that may be applied thereto, which are in turn applied to the respective inner and outer tubes 30, 40. However, the manner in which these fittings 60, 70 are attached to the inner and outer tubes 30, 40, and where the fittings 60, 70 are disposed with respect to the overall inversion tube assembly 20 (i.e., at the top end 27 or the bottom end 28), may vary from one specific embodiment to another.

For example, as shown in the embodiment of FIG. 11, the inner fitting 60 is disposed at the top 27 of the inversion tube 20 and is connected with the second end 34 of the inner tube 30, while the outer fitting 70 is disposed at the bottom 28 of the inversion tube 20 and is connected indirectly with the fourth end 44 of the outer tube 40 via an outer sleeve 80. The outer sleeve 80 is disposed about the outer tube 40 (i.e., around and outside the outer tube 40). In this configuration, the outer sleeve 80 has a fifth end 82 attached to the outer fitting 70 and a sixth end 84 attached to the fourth end 44 of the outer tube 40.

In FIG. 11, the inner fitting 60 includes a spherical bearing 62 which may be attached to an external member (not shown) which may pull upward with a tension force. The inner fitting 60 also includes a disc 64 disposed inside the inner tube 30, with a stem 63 attached to the disc 64 and protruding upward through an aperture in the closed end 36 of the tube 20. As illustrated here, the stem 63 may be externally threaded for engagement with internal threads inside the spherical bearing 62, with an internally threaded locking ring 65 being screwed onto the stem 63 between the disc 64 and the spherical bearing 62.

Additionally in FIG. 11, the outer fitting 70 includes a spherical bearing 72 which is attached to an external member (not shown) which may pull downward with a tension force opposite to the upward tension force acting on the inner fitting 60. An externally threaded stem 73 is screwed into internal threads inside the spherical bearing 72, and an internally threaded annular plate 77 having a downwardly extending axial boss 78 is screwed onto the other end of the stem 73. The annular plate 77 has a circumferential flange 79 extending downward from the circumferential edge of the plate 77, with fasteners 81 (e.g., rivets, welds, etc.) securing the fifth end 82 of the outer sleeve 80 to the circumferential flange 79 of the outer fitting 70.

In FIG. 12, the relative locations of the inner and outer fittings 60, 70 are opposite that of FIG. 11, with the inner fitting 60 being disposed at the bottom 28 of the inversion tube 20 and the outer fitting 70 disposed at the top 27. Another difference between the embodiments of FIGS. 11 and 12 is that the embodiment of FIG. 12 includes an axial member 61 as part of the inner fitting 60. The axial member 61 extends inside the inner tube 30 and terminates in a disc 64 connected with the closed end 36 of the inversion tube 20 at the second end 34 of the inner tube 30 by way of an externally threaded stem 63 attached to the disc 64 and protruding upward through an aperture in the closed end 36 of the tube 20 and a locking ring 65 being screwed onto the stem 63. And while the embodiment of FIG. 12 has an outer sleeve 80 disposed about the outer tube 40 (similar to FIG. 11), another difference between the embodiments of FIGS. 11 and 12 is that in the embodiment of FIG. 12, the outer sleeve 80 is not attached to the outer tube 40.

In the embodiment of FIG. 12, the inner fitting 60 includes structure that is similar to the structure of the outer fitting 70 of FIG. 11. The inner fitting 60 includes a spherical bearing 62 which may be attached to an external member (not shown) which may pull downward with a tension force. An externally threaded stem 63 is screwed into internal threads inside the spherical bearing 62, and an internally threaded annular plate 67 having a downwardly extending axial boss 68 may be screwed onto the other end of the stem 63. As shown in FIG. 12, the stem 63 and the axial member 61 may be formed as a single piece; however, they may also be formed and used as two separate pieces. The annular plate 67 has a circumferential flange 69 extending downward from the circumferential edge of the plate 67, with one end of the outer sleeve 80 (e.g., the fifth end 82) extending and fitting snugly along the outer periphery of the circumferential flange 69.

The outer fitting 70 of FIG. 12 includes a spherical bearing 72 which may be attached to an external member (not shown) which may pull upward with a tension force opposite to the downward tension force acting on the inner fitting 60. The outer fitting 70 also includes an end cap 75 attached to the spherical bearing 72, with a circumferential wall 76 descending downward from the outer periphery of the end cap 75. The fourth end 44 of the outer tube 40 is attached to the circumferential wall 76 with suitable fasteners 81 (e.g., welds, rivets, etc.), and the second end 34 of the inner tube 30 is attached to the axial member 61 (e.g., via the disc 64). The other end of the outer sleeve 80 (e.g., the sixth end 84) may abut the circumferential wall 76 as shown, or it may optionally extend and fit snugly along the outer periphery of the circumferential wall 76.

FIG. 13 shows an alternative embodiment which is configured for absorbing a net compression force $F_c$. Here, the relatively short outer tube 40 may be formed by an external inversion process, and the structure and arrangement of the inner and outer fittings 60, 70 generally match that of the inner and outer fittings 60, 70 of FIG. 11. The fifth end 82 of the outer sleeve 80 is attached to the outer fitting 70, and the sixth end 84 of the outer sleeve 80 is attached to a connection ring 85 that wraps around the outside of the inner tube 30. The fourth end 44 of the outer tube 40 is also attached to the connection ring 85, thus connecting the sixth end 84 of the outer sleeve 80 and the fourth end 44 of the outer tube 40 directly or indirectly to each other. (Alternatively, the connection ring 85 can be omitted and the fourth and sixth ends 44, 84 may be directly attached to each other.)

FIGS. 14-15 show two additional embodiments configured for absorbing a net compression force $F_c$. The connections of the inner and outer fittings 60, 70 to the inner and outer tubes 30, 40 are the same for these two embodiments, with the only difference being the addition of a two-part outer sleeve 80 and sliding collars 89 to FIG. 15. In both embodiments, the relatively short inner tube 30 may be formed using an internal inversion process. In FIG. 15, the two-part outer sleeve 80 includes a first or inner shell 86 which slidably fits within a second or outer shell 88, thus forming a "telescoping" outer sleeve 80. As illustrated in FIG. 15, the outer sleeve 80 is not attached to either of the inner and outer tubes 30, 40. However, the first or inner shell 86 may hug the outer tube 40, and the overall outer sleeve 80 may also be supported by the two sliding collars 89. Note that while the lower sliding collar 89 appears to be internally threaded and the upper sliding collar 89 appears to not be internally threaded, either or both of the sliding collars 89 may be threaded or not threaded as desired. The sliding collars 89 may also serve as dust caps to prevent foreign matter from entering into the internal structure of the inversion tube assembly 20.

In embodiments that include an outer sleeve 80, the outer sleeve 80 may be configured to provide some degree of resistance against buckling to the outer tube 40 (and possibly the inner tube 30 as well) when the inner and outer fittings 60, 70 are subjected to a compressive force $F_c$. The outer sleeve 80 may also protect the outer and inner tubes 40, 30 from damage during operational use.

When a net compression force or loading $F_c$ above a predetermined compression threshold or a net tension force or loading $F_T$ above a predetermined tension threshold is applied to the inner and outer fittings 60, 70, one of the inner and outer tubes 30, 40 may increase in length and the other of the inner and outer tubes 30, 40 may decrease in length. For example, if a net tension loading $F_T$ is applied to the fittings 60, 70 of the embodiment shown in FIG. 11, such that the tension loading $F_T$ is higher than the predetermined tension limit or threshold for that embodiment, then the overall length $L_{DW}$ of the inversion tube 20 would increase, with the inner tube length $L_i$ also increasing in length and the outer tube length $L_o$ decreasing in length. On the other hand, if the same set of tension loading $F_T$ and predetermined tension threshold were applied to the embodiment of FIG. 12, the change in inner and outer tube lengths $L_i$, $L_o$ would be opposite to that of the FIG. 11 embodiment. That is, in the embodiment of FIG. 12, as the overall length $L_{DW}$ of the inversion tube 20 increases, the inner tube length $L_i$ would decrease in length, and the outer tube length $L_o$ would increase in length. Thus, the inversion-formed double-walled tube/energy absorbing assembly 20 may be configured for absorbing and/or dissipating impulse energy when a compression or tension impulse force $F_c$, $F_T$ above a respective predetermined compression or tension threshold is applied to the inversion tube 20. More specifically, the inner and outer tubes 30, 40 and the transition portion 50 may be configured for dissipating energy (e.g., impulse energy) when a compression or tension force $F_c$, $F_T$ above the respective predetermined compression or tension threshold is applied to the inner and outer fittings 60, 70, causing the inner and outer tubes 30, 40 to change in length $L_i$, $L_o$. To achieve this capability for energy absorption and dissipation, the inner and outer tube thicknesses $t_i$, $t_o$ may be carefully profiled such that one or both of them varies along some length $L_i$, $L_o$ of the respective inner and/or outer tubes 30, 40 in a manner that achieves the desired energy absorption and dissipation capability, including providing the desired predetermined compression and/or tension thresholds.

Thus, after a pre-inversion tube 22 has been inverted by having one end pressed inward or rolled outward along some length $L_{pre}$ of the pre-inversion tube 22—thereby creating an internal or external inversion 24, 26 having the abovementioned plastic deformation zones 52 that have been formed by "rolling up" some portion of the initial walls of the pre-inversion tube 22—the resulting inversion tube 20 may be assembled with the inner and outer fittings 60, 70 and the optional outer sleeve 80 (with appropriate connections made among the inner and outer fittings 60, 70, the ends of the inner and outer tubes 30, 40 and the ends of the outer sleeve 80), such that when the inversion tube assembly 20 is placed into service and a net compression or tension impulse force $F_c$, $F_T$ above the respective predetermined compression or tension threshold is applied to the inversion tube assembly 20 via the inner and outer fittings 60, 70, the impulse force will be absorbed and/or dissipated as either (i) the "rolled up" portion of the initial pre-inversion tube walls are "unrolled", or (ii) additional portions of the walls are "rolled up" (depending on the particular configuration of the inversion tube assembly 20 being used).

According to another embodiment, an inversion tube type energy absorber 20 includes: an outer tube 40 having an outer wall thickness $t_o$ and an outer tube length $L_o$; an inner tube 30 disposed inside the outer tube 40 and having an inner wall thickness $t_i$ and an inner tube length $L_i$ substantially equivalent to the outer tube length $L_o$; and a transition portion 50 connecting the inner tube 30 and the outer tube 40 and configured as a plastic deformation zone 52. In this embodiment, at least one of the inner and outer wall thicknesses $t_i$, $t_o$ varies along its respective inner or outer tube length $L_i$, $L_o$.

In this embodiment, the inversion tube type energy absorber 20 may further include: an outer sleeve 80 disposed about the outer tube 40 and having opposed fifth and sixth ends 82, 84; an inner fitting 60 attached to a second end 34 of the inner tube 30 distal from the transition portion 50; and an outer fitting 70 attached to the fifth end 82 of the outer sleeve 80, with the sixth end 84 of the outer sleeve 80 being attached to a fourth end 44 of the outer tube 40 distal from the transition portion 50. In this configuration, the inner and outer fittings 60, 70 may be configured for receiving compression and/or tension forces $F_c$, $F_T$ as applied thereto and for conveying the compression and/or tension forces $F_c$, $F_T$ to the inner and outer tubes 30, 40, respectively.

According to yet another embodiment, an energy absorbing inversion tube assembly 20 includes an inner tube 30 disposed within an outer tube 40, the inner and outer tubes 30, 40 having respective wall thicknesses $t_o$ and being connected with each other via a transition portion 50, wherein the wall thickness $t_i$, $t_o$ of at least one of the inner and outer tubes 30, 40 varies along a respective length $L_i$, $L_o$ of the inner or outer tube 30, 40. The energy absorbing inversion tube assembly 20 also includes an inner fitting 60 attached to a second end 34 of the inner tube 30 distal from the transition portion 50, and an outer fitting 70 attached to a fourth end 44 of the outer tube 40 distal from the transition portion 50. In the energy absorbing inversion tube assembly 20, the inner and outer fittings 60, 70 are configured for conveying external compression and/or tension forces $F_c$, $F_T$ to the inner and outer tubes 30, 40, respectively.

The energy absorbing inversion tube assembly 20 may further include an outer sleeve 80 disposed about the outer tube 40 and configured to provide resistance against buckling to the inner and/or outer tube 30, 40 when the inner and outer fittings 60, 70 are subjected to a compressive force $F_c$. The outer sleeve 80 may have a fifth end 82 attached to the outer fitting 70 and a sixth end 84 attached to the fourth end 44 of the outer tube 40.

Figure 17:
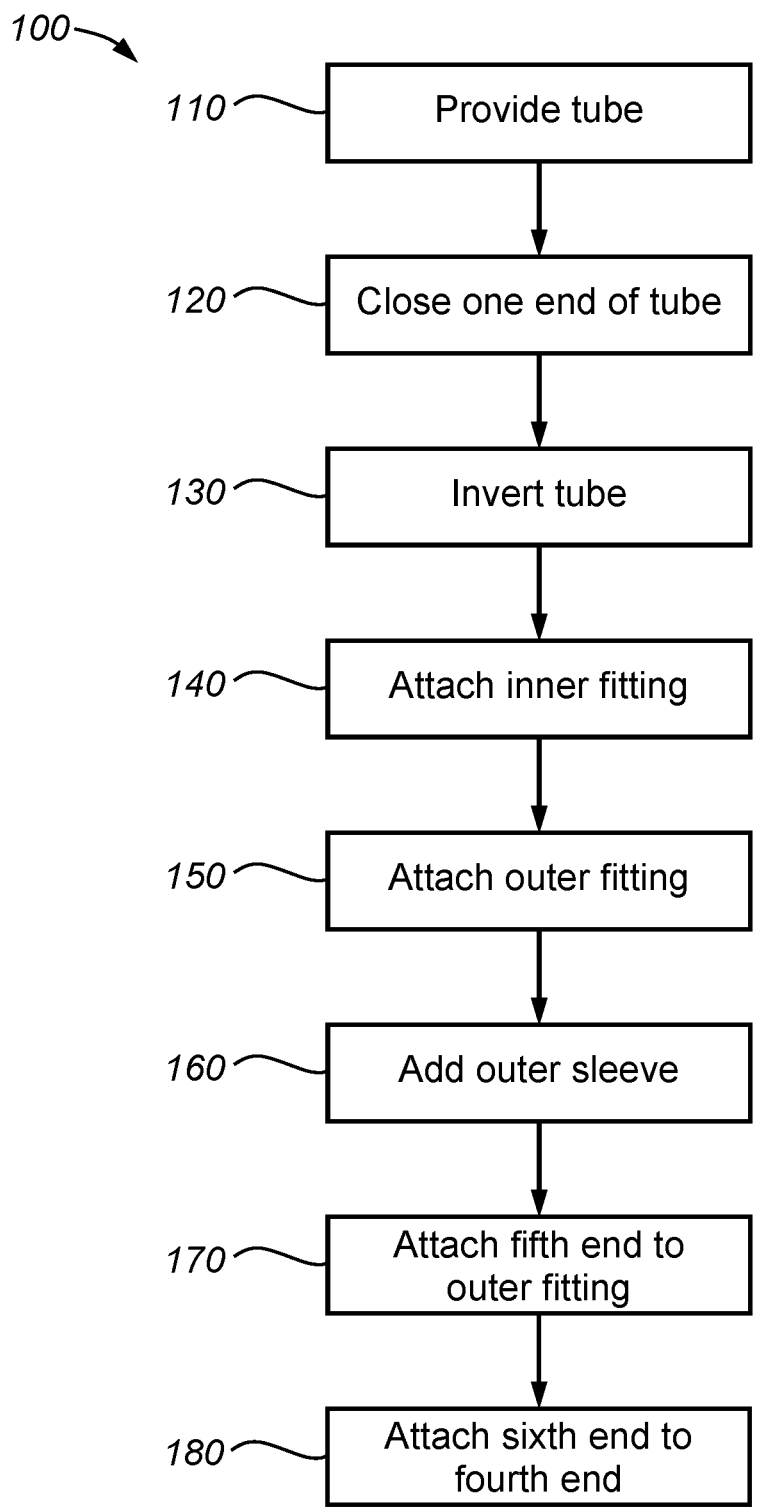
FIG. 17 is a flowchart for a method of manufacturing an energy absorbing inversion tube assembly.

FIG. 17 shows a flowchart for a method 100 of manufacturing an energy absorbing inversion tube assembly 20, which may also be visualized by the progression of views shown in FIGS. 1, 9 and 10. At block 110 of FIG. 17, a pre-inversion tube 22 is provided having opposed first and second ends $22_1$, $22_2$, an initial length $L_{pre}$ and an initial wall thickness $t_{pre}$ which varies along at least a portion of the initial length $L_{pre}$. At block 120, an optional step may be performed, in which the first or second end $22_1$, $22_1$ may be closed, such as by spinning or swaging. More specifically, if the tube 22 is to undergo an internal inversion, then the first end $22_1$ may be closed, but if the tube 22 is to undergo an external inversion, then the second end $22_2$ may be closed. And at block 130, the first end $22_1$ of the tube 22 is inverted toward the second end $22_2$—either by pressing the closed first end $22_1$ inward toward the open second end $22_2$ to create in internal inversion 24, or by rolling the open first end $22_1$ outward toward the closed second end $22_2$ to create an external inversion 26—thereby forming an inversion tube 20 having an inner tube 30 disposed within an outer tube 40 with the inner and outer tubes 30, 40 being connected with each other via a U-shaped transition portion 50, wherein a respective wall thickness $t_i$, $t_o$ of at least one of the inner and outer tubes 30, 40 varies along a respective length $L_i$, $L_o$ of the inner or outer tube 30, 40.

At block 140, an inner fitting 60 is attached to a second end 34 of the inner tube 30 that is distal from the transition portion 50 (and also distal from the opposed first end 32 of the inner tube 30), and at block 150, an outer fitting 70 is attached to a fourth end 44 of the outer tube 40 that is distal from the transition portion 50 (and also distal from the opposed third end 42 of the outer tube 40), wherein the inner and outer fittings 60, 70 are configured for conveying external compression and/or tension forces $F_c$, $F_T$ to the inner and outer tubes 30, 40, respectively. Additionally, the method 100 may also include, at block 160, disposing an outer sleeve 80 about the outer tube 40, wherein the outer sleeve 80 has opposed fifth and sixth ends 82, 84. At block 170, the fifth end 82 of the outer sleeve 80 may be attached to the outer fitting 70, and at block 180, the sixth end 84 of the outer sleeve 80 may be attached to the fourth end 44 of the outer tube 40.

As discussed above, it is apparent that the double-walled inversion tube/energy absorber assembly 20 of the present disclosure—which utilizes a varying and non-constant wall thickness $t_o$ along some portion of the inner and/or outer tubes 30, 40— solves the technical problem of design limitation, which is presented by the constant wall thickness utilized in conventional inversion tubes. The present inversion tube/energy absorber assembly 20 overcomes this technical problem by the technical effect of utilizing the aforementioned varying wall thickness $t_i$ $t_o$ along one or both of the tubes 30, 40, thereby providing a significant technical advantage over other approaches. In addition to the use of the inversion tube/energy absorber assembly 20 for aircraft seat 10 applications, many other uses and applications may be contemplated, such as those where conventional shock absorbers have traditionally been used. For each use or application, the designer may determine the appropriate specifications for the pre-inversion tube 22 and resulting inversion tube 20, which may include: the material (e.g., 3003H14 aluminum), the method of inversion (i.e., internal or external), starting dimensions of the pre-inversion tube 22, final dimensions of the finished inversion tube 20, and the thickness profile(s) that the inner and/or outer tubes 30, 40 should follow.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", "upward", "downward", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like. Relatedly, the word "distal" may be used herein to describe the opposite of "proximate"; e.g., "far (from)", "distantly removed (from)", "spaced apart (from)", "on the other end (of/from)" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An inversion-formed double-walled tube, comprising:
an outer tube having an outer wall thickness;
an inner tube disposed inside the outer tube and having an inner wall thickness; and
a transition portion connecting the inner tube and the outer tube;
wherein at least one of the inner and outer wall thicknesses varies along a length of the double-walled tube, and wherein the inner and outer wall thicknesses vary differently from each other along the length of the double-walled tube.

2. The inversion-formed double-walled tube of claim 1, wherein the inner tube, the outer tube and the transition portion are made of aluminum.

3. The inversion-formed double-walled tube of claim 2, wherein the aluminum is 3003H14 aluminum.

4. The inversion-formed double-walled tube of claim 1, wherein the inner and outer wall thicknesses vary similarly to each other along the length of the double-walled tube.

5. The inversion-formed double-walled tube of claim 1, wherein the inner and outer wall thicknesses vary oppositely from each other along the length of the double-walled tube.

6. The inversion-formed double-walled tube of claim 1, wherein the outer tube is formed as an external inversion of the inner tube wherein the outer tube and the transition portion are configured as a plastic deformation zone, or the inner tube is formed as an internal inversion of the outer tube wherein the inner tube and the transition portion are configured as a plastic deformation zone.

7. The inversion-formed double-walled tube of claim 6, wherein the inversion-formed double-walled tube is configured for dissipating impulse energy when a compression or tension impulse force above a respective predetermined compression or tension threshold is applied thereto.

8. The inversion-formed double-walled tube of claim 1, wherein the inner and outer tubes have respective tube lengths that are substantially equivalent to each other.

9. The inversion-formed double-walled tube of claim 1, wherein the inner tube has a first end adjoining the transition portion and a second end opposite the first end, and the outer tube has a third end adjoining the transition portion and a fourth end opposite the third end, and wherein the inversion-formed double-walled tube further comprises:
an inner fitting attached to the second end of the inner tube; and
an outer fitting attached directly or indirectly to the fourth end of the outer tube;
wherein the inner and outer fittings are configured for receiving compression and/or tension forces as applied thereto.

10. The inversion-formed double-walled tube of claim 9, wherein the inner fitting includes an axial member connected with the second end of the inner tube and configured to extend inside the inner tube.

11. The inversion-formed double-walled tube of claim 9, further comprising:
an outer sleeve disposed about the outer tube and configured to provide resistance against buckling to the inner and/or outer tube when the inner and outer fittings are subjected to a compressive force.

12. The inversion-formed double-walled tube of claim 11, wherein the outer sleeve has a fifth end attached to the outer fitting and a sixth end attached to the fourth end of the outer tube.

13. The inversion-formed double-walled tube of claim 9, wherein when a compression force above a predetermined compression threshold or a tension force above a predetermined tension threshold is applied to the inner and outer fittings, one of the inner and outer tubes increases in length and the other of the inner and outer tubes decreases in length.

14. The inversion-formed double-walled tube of claim 13, wherein the inner and outer tubes and the transition portion are configured for dissipating energy when the compression or tension force above the respective predetermined compression or tension threshold is applied to the inner and outer fittings and the inner and outer tubes change in length.

15. An inversion tube type energy absorber, comprising:
an outer tube having an outer wall thickness and an outer tube length;
an inner tube disposed inside the outer tube and having an inner wall thickness and an inner tube length substantially equivalent to the outer tube length; and
a transition portion connecting the inner tube and the outer tube and configured as a plastic deformation zone;
wherein at least one of the inner and outer wall thicknesses varies along its respective inner or outer tube length, and wherein the inner and outer wall thicknesses vary differently from each other along the length of the double-walled tube.

16. The inversion tube type energy absorber of claim 15, further comprising:
an outer sleeve disposed about the outer tube and having opposed fifth and sixth ends;
an inner fitting attached to a second end of the inner tube distal from the transition portion; and
an outer fitting attached to the fifth end of the outer sleeve, with the sixth end of the outer sleeve being attached to a fourth end of the outer tube distal from the transition portion,
wherein the inner and outer fittings are configured for receiving compression and/or tension forces as applied thereto and for conveying the compression and/or tension forces to the inner and outer tubes.

17. A method of manufacturing an energy absorbing inversion tube assembly, comprising:
providing a tube having opposed first and second ends, an initial length and an initial wall thickness which varies along at least a portion of the initial length; and
inverting the first end of the tube toward the second end, thereby forming a double-walled inversion tube having an inner tube disposed within an outer tube with the inner and outer tubes being connected with each other via a transition portion and with the inner tube having an inner wall thickness and the outer tube having an outer wall thickness, wherein at least one of the inner and outer wall thicknesses varies along a respective length of the inner or outer tube, and wherein the inner and outer wall thicknesses vary differently from each other along a length of the inversion tube.

18. The method of claim 17, further comprising:
attaching an inner fitting to a second end of the inner tube distal from the transition portion; and
attaching an outer fitting to a fourth end of the outer tube distal from the transition portion;
wherein the inner and outer fittings are configured for conveying external compression and/or tension forces to the inner and outer tubes, respectively.

19. The method of claim 18, further comprising:
disposing an outer sleeve having opposed fifth and sixth ends about the outer tube; and
attaching the fifth end of the outer sleeve to the outer fitting and the sixth end of the outer sleeve to the fourth end of the outer tube.

* * * * *